(12) United States Patent
Ning

(10) Patent No.: US 8,717,465 B2
(45) Date of Patent: May 6, 2014

(54) BLEMISH DETECTION SYTEM AND METHOD

(75) Inventor: Wen-Min Ning, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 689 days.

(21) Appl. No.: 12/962,577

(22) Filed: Dec. 7, 2010

(65) Prior Publication Data

US 2011/0279715 A1 Nov. 17, 2011

(30) Foreign Application Priority Data

May 12, 2010 (TW) .................................. 99115047

(51) Int. Cl.
*H04N 9/64* (2006.01)
(52) U.S. Cl.
USPC ............................ 348/251; 348/246; 348/247
(58) Field of Classification Search
USPC ......................................... 348/251, 246, 247
See application file for complete search history.

(56) References Cited

U.S. PATENT DOCUMENTS

2001/0033683 A1* 10/2001 Tanaka et al. ................. 382/149

* cited by examiner

*Primary Examiner* — Joel Fosselman
(74) *Attorney, Agent, or Firm* — Novak Druce Connolly Bove + Quigg LLP

(57) ABSTRACT

An image blemish detecting system includes an image capturing module, a brightness adjusting module, and a blemish detecting module. The image capturing module captures an image. The brightness adjusting module adjusts the brightness of the image to obtain a second image having substantially uniform brightness. The blemish detecting module calculates a brightness ratio of each pixel in the second image, marks the pixels of which the brightness ratios are not smaller than a predetermined reference value as "1", and marks the other pixels as "0". The blemish detecting module calculates the quantity of the pixels in a continuous area in which all pixels are marked as "1", and determines that the continuous area is a blemish if the quantity of the pixels in the continuous area is greater than or equal to the predetermined pixel quantity.

20 Claims, 7 Drawing Sheets

US 8,717,465 B2

BLEMISH DETECTION SYTEM AND METHOD

BACKGROUND

1. Technical Field

The present disclosure relates to image processing technologies, and particularly relates to a blemish detection system and method.

2. Description of Related Art

A blemish detection process is usually carried out after camera assemblies are assembled to detect whether or not a blemish is introduced to the camera assemblies during the assembly process thereof to guarantee image quality of the camera assemblies. Currently, the blemish detection process is often carried out by visual inspection under varying criteria, especially given the human element involved (e.g., variances in skill level and in standards of individual inspectors), and is an inefficient use of man-power and resources.

Therefore, it is desirable to provide a blemish detection system and method that can overcome the above-mentioned limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
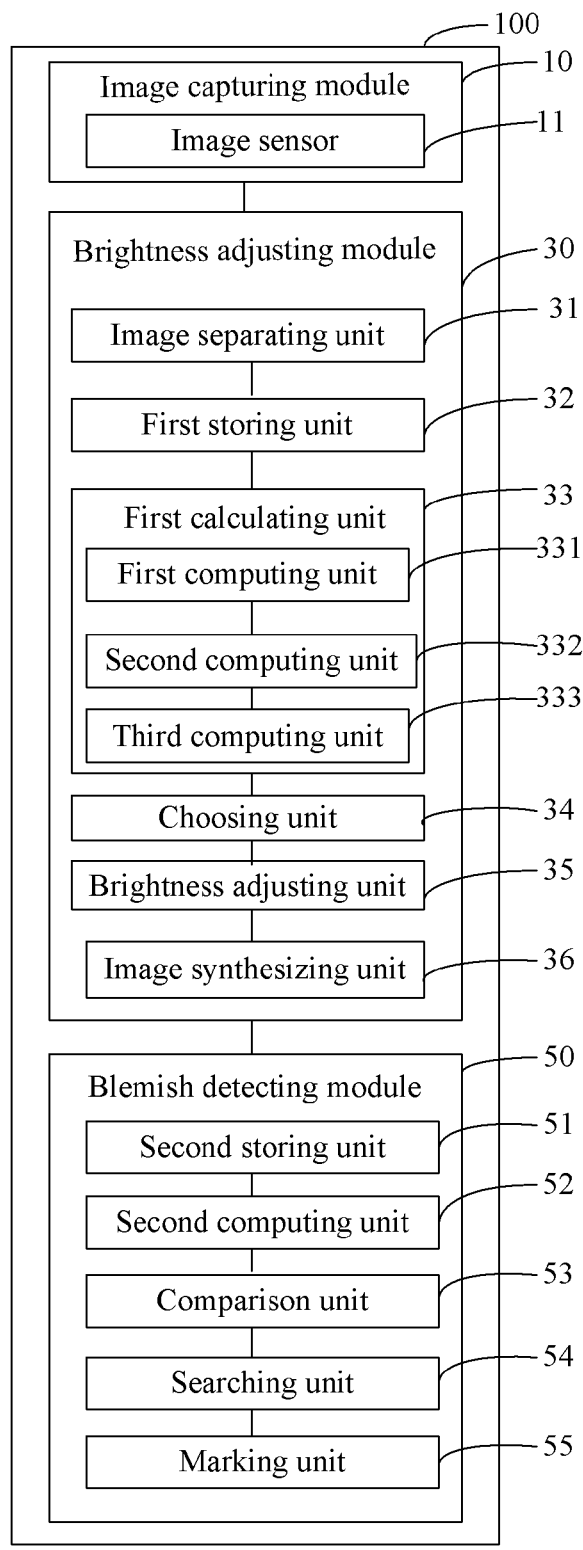
FIG. 1 is a functional block diagram of a blemish detection system, according to an exemplary embodiment.

Referring to FIG. 1, a blemish detection system 100, according to an exemplary embodiment, includes an image capturing module 10, a brightness adjusting module 30, and a blemish detecting module 50.

The image capturing module 10 includes an image sensor 11 used for capturing a first image. In the present embodiment, the image capturing module 10 is a video graphics array (VGA) camera module and accordingly the resolution of the first image is 640 by 480 (640×480) pixels. The image sensor 11 outputs the first image as a 10-bit binary signal.

The brightness adjusting module 30 includes an image separating unit 31, a first storing unit 32, a first calculating unit 33, a choosing unit 34, a brightness adjusting unit 35, and an image synthesizing unit 36.

The image separating unit 31 is used for separating the first image according to four different color channels, i.e., a red channel (R channel), a blue channel (B channel), a green-red channel (Gr channel), and a green-blue channel (Gb channel), and thus to obtain an R channel image, a B channel image, a Gr channel image, and a Gb channel image.

The first storing unit 32 stores a second-degree parabola equation $K_1=(K_0-S)(ar^2+br+1)+S$, wherein $K_1$ represents a first brightness component value of each pixel in each channel image, $K_0$ represents an initial brightness component value of each pixel in each channel image, a is a coefficient of the equitation and is about $5\times10^{-14}$, b is a coefficient of the equitation and is about $7\times10^{-6}$ in this embodiment, r is the square value of the number of the pixels which are located between each pixel and a center pixel in each channel image, S is the optical black value (OB value) of the image sensor 11. The OB value represents the color component value of each pixel in each channel image which the image sensor 11 outputs when the image sensor 11 does not receive the light. In particular, the range of the actual light reaction value of the 8-bit image sensor is $0\sim2^8-1(255)$. However, due to the noise, the actual light reaction is not zero when the image sensor does not receive light. Therefore, it needs to subtract the corresponding OB value, which can be determined by the characteristics of the image sensor and/or experimental data, from the output brightness component value of each pixel in each channel image, to clamp the brightness component of each pixel to the normal range 0~255. Different kinds of image sensors have different corresponding OB values. Typically, the OB value of the 8-bit image sensor is about 16, and the OB value of the 10-bit image sensor is about 64.

The first calculating unit 33 includes a first computing unit 331, a second computing unit 332, and a third computing unit 333.

The first computing unit 331 is used for calculating a first brightness component value $K_1$ of each pixel in each channel image. The first brightness component value $K_1$ of a particular pixel is calculated according to the following steps: calculating an initial brightness component value $K_0$ of the particular pixel in each channel image and the square value r of the number of the pixels which are located between the particular pixel and the center pixel in each channel image; taking the $K_0$ and r into the second-degree parabola equation to calculate $K_1$.

The second computing unit 332 is used for calculating a second brightness component value of each pixel in each channel image. The second brightness component value of a particular pixel is calculated according to the following steps: choosing a square pixel area of j by j (j×j) pixels in each channel image, wherein the particular pixel is at the center of the square pixel area; calculating a sum of the first brightness component values of all pixels in the square pixel area; dividing the sum by the total number of pixels in the square pixel area (i.e., j×j). In the present embodiment, j is 45.

Figure 2:
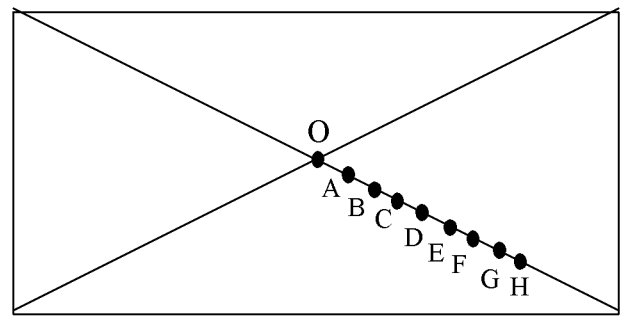
FIG. 2 is a schematic view of the system of FIG. 1 in a calculation step.

The third computing unit 333 is used for calculating a third brightness component value of each pixel in each channel image. Referring to FIG. 2, the third brightness component value of a particular pixel A is calculated according to the following steps: dividing the second brightness component value of the particular pixel A by that of the center pixel O to obtain a first coefficient of each pixel; selecting a number of successive pixels arranged in a line along the direction from the center pixel O to the particular pixel A; calculating the difference values of the first coefficients of every two adjacent pixels; calculating an average value of the difference values; subtracting the average value from the first coefficient of the particular pixels A to obtain a second coefficient of the particular pixel A; multiplying the second coefficient by the initial brightness component value of the particular pixel A in each channel image to obtain the third brightness component value of the particular pixel A of each channel image. In the present embodiment, seven pixels arranged in a line (i.e. the pixels B, C, D, E, F, G, H) along the direction from the center pixel O to the particular pixel A is selected. The first coefficients of the eight pixels A~H are 0.99, 0.96, 0.88, 0.76, 0.64, 0.53, 0.48, 0.31, 0.29, the difference values of every two adjacent pixels are 0.03, 0.08, 0.12, 0.12, 0.11, 0.05, 0.15, 0.02, the average value of the eight difference values is 0.085, the second coefficient of the particular pixel A is 0.99−0.085=0.905. The third brightness component value of the particular pixel A is obtained by multiplying the second coefficient with the initial brightness component value of the particular pixel A.

The choosing unit 34 is used for choosing to adjust the brightness of each pixel in each channel image according to the first, or second component values.

The brightness adjusting unit 35 is used for adjusting the brightness of each pixel in each channel image according to the choosing result, to obtain four adjusted channel images.

The image synthesizing unit 36 is used for synthesizing the adjusted channel images to obtain a second image. The second image has substantially uniform brightness.

The blemish detecting module 50 includes a second storing unit 51, a second computing unit 52, a comparison unit 53, a searching unit 54, and a marking unit 55.

The second storing unit 51 stores a predetermined reference value and a predetermined pixel quantity. In this embodiment, the predetermined reference value is 0.1, the predetermined pixel quantity is 82.

Figure 3:
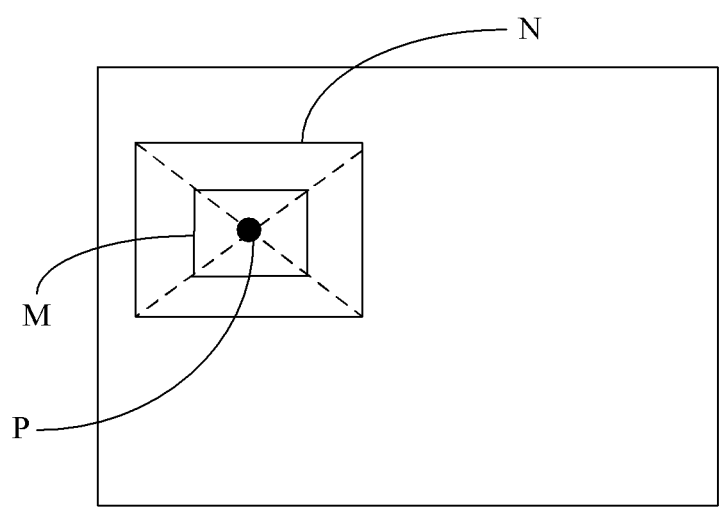
FIG. 3 is a schematic view of the system of FIG. 1 in a blemish detection step.

Referring to FIG. 3, the second computing unit 52 is used for calculating a brightness ratio of each pixel in the second image. The brightness ratio of a particular pixel P is calculated according to the following steps: choosing a first square pixel area M of m×m pixels and a second square pixel area N of n×n pixels in the second image, both of which have a same center pixel P, wherein m and n are integer, m<n; taking the averaged brightness value of all pixels in the first square pixel area M as a first average brightness value of the pixels P in the second image; taking the averaged brightness of the second square pixel area N as a second average brightness value of the pixel P in the second image; dividing the first average brightness value by the second average brightness value of the pixel P to obtain a brightness ratio of the pixel P in the second image. In this embodiment, m is 9, n is 31.

The comparison unit 53 is used for comparing the brightness ratio of each pixel in the second image with the predetermined reference value.

The marking unit 55 is used for marking each pixel as "1" or "0" according to the comparison result of the comparison unit 53 to obtain a chart making up of "1" and "0", i.e. the pixels of which the brightness ratios are not smaller than the predetermined reference value are marked as "1", the other pixels are marked as "0".

The searching unit 54 is used for searching a continuous area in which all pixels are marked as "1" in the chart.

The second computing unit 52 is also used for calculating the quantity of the pixels in the continuous area in which all pixels are marked as "1" in the chart.

The comparison unit 53 is also used for comparing the quantity of the pixels in the continuous area in which all pixels are marked as "1" with the predetermined pixel quantity, if the calculated quantity of pixels is not smaller than the predetermined pixel quantity, it is determined that the continuous area is a blemish.

The marking unit 55 is also used for marking the location of the determined blemish.

In other embodiments, the separating unit 31 and the image synthesizing module 36 can be omitted. The first computing unit 331 is used for calculating an initial brightness value of each pixel in the first image and the square value r of the number of the pixels which are located between each pixel and a center pixel in the first image to obtain the first brightness $K_1$ of each pixel in the first image based on the second-degree parabola equation. The second computing unit 332 is used for calculating a second brightness value of each pixel in the first image based on the first brightness value of the first image. The third computing unit 332 is used for calculating a third brightness value of each pixel in the first image based on the second brightness value. The brightness adjusting unit 35 is used for adjusting the brightness of the first image according to the first brightness value, the second brightness value, or the third brightness value to obtain the second image.

Figure 4:
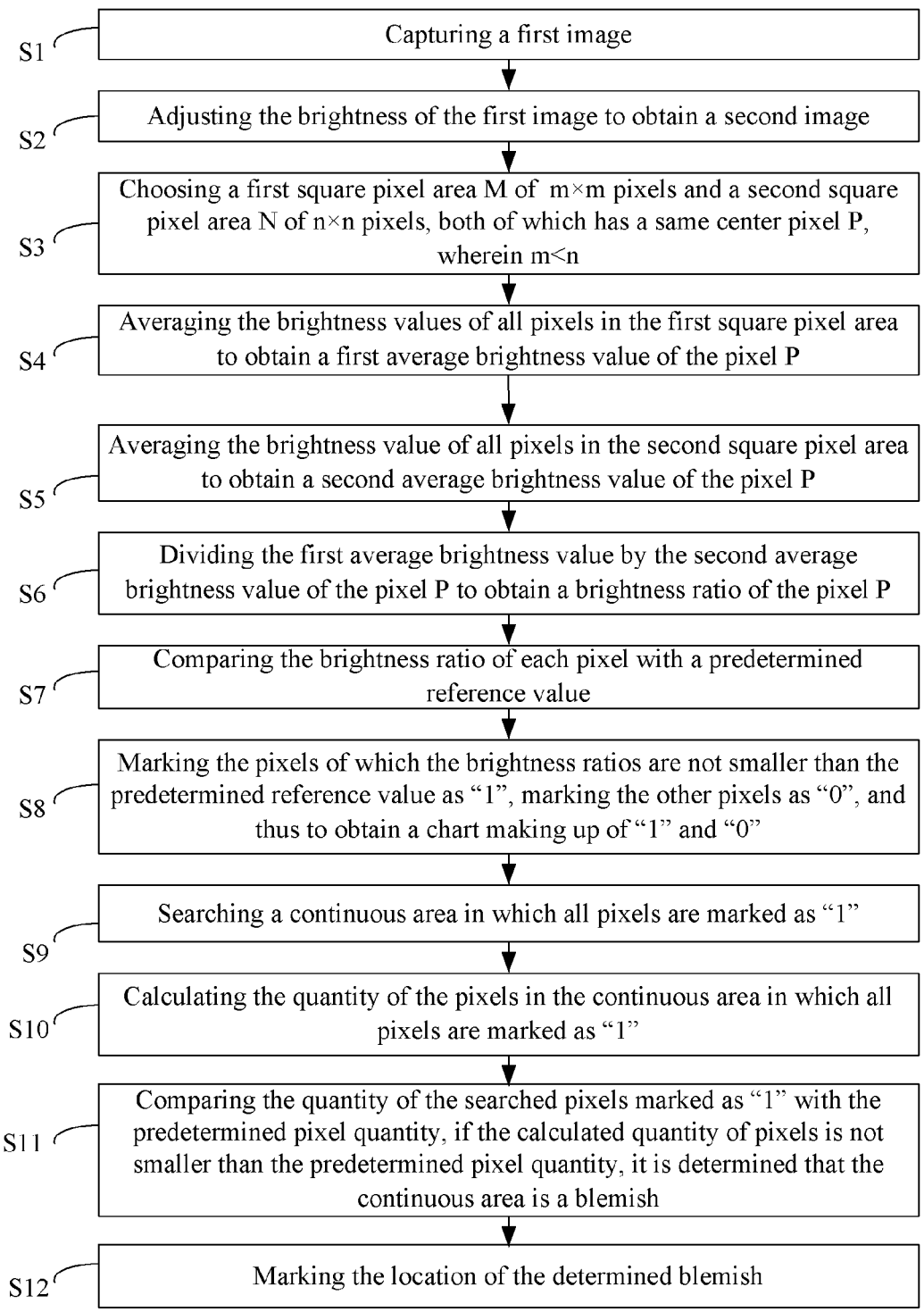
FIG. 4 is a flow chart of a blemish detection method.

Referring to FIG. 4, a blemish detection method, includes the following steps.

In S1, a first image is captured.

In S2, the brightness of the first image is adjusted to obtain a second image. The second image has substantially uniform brightness.

In S3, a first square pixel area M of m×m pixels and a second square pixel area N of n×n pixels in the second image are chosen. The first square pixel area M and the second square pixel area N are concentric. As shown in FIG. 3, the first and second square pixel areas have a same center pixel P, wherein m and n are integer, m<n.

In S4, the averaged brightness value of all pixels in the first square pixel area M is taken as a first average brightness value of the pixel P.

In S5, the averaged brightness value of all pixels in the second square pixel area N is taken as a second average brightness value of the pixel P.

In S6, the first average brightness value is divided by the second average brightness value of the center pixel P to obtain a brightness ratio of the pixel P. In this embodiment, m is 9, n is 31. By this means, the brightness ratio of each pixel is obtained.

In S7, the brightness ratio of each pixel is compared with a predetermined reference value. In this embodiment, the predetermined reference value is 0.1.

In S8, the pixels of which the brightness ratios are not smaller than the predetermined reference value are marked as "1", the other pixels are marked as "0". Thus a chart making up of "1" and "0" is obtained.

In S9, a continuous area in which all pixels are marked as "1" is searched.

In S10, the quantity of pixels in the continuous area in which all pixels are marked as "1" is calculated.

In S11, the pixel quantity of the searched pixels marked as "1" is compared with a predetermined pixel quantity, if the quantity of the searched pixels is no smaller than the predetermined pixel quantity, it is determined that the continuous area is a blemish. In this embodiment, the predetermined pixel quantity is 82.

In S12, the location of the determined blemish is marked.

Figure 5:
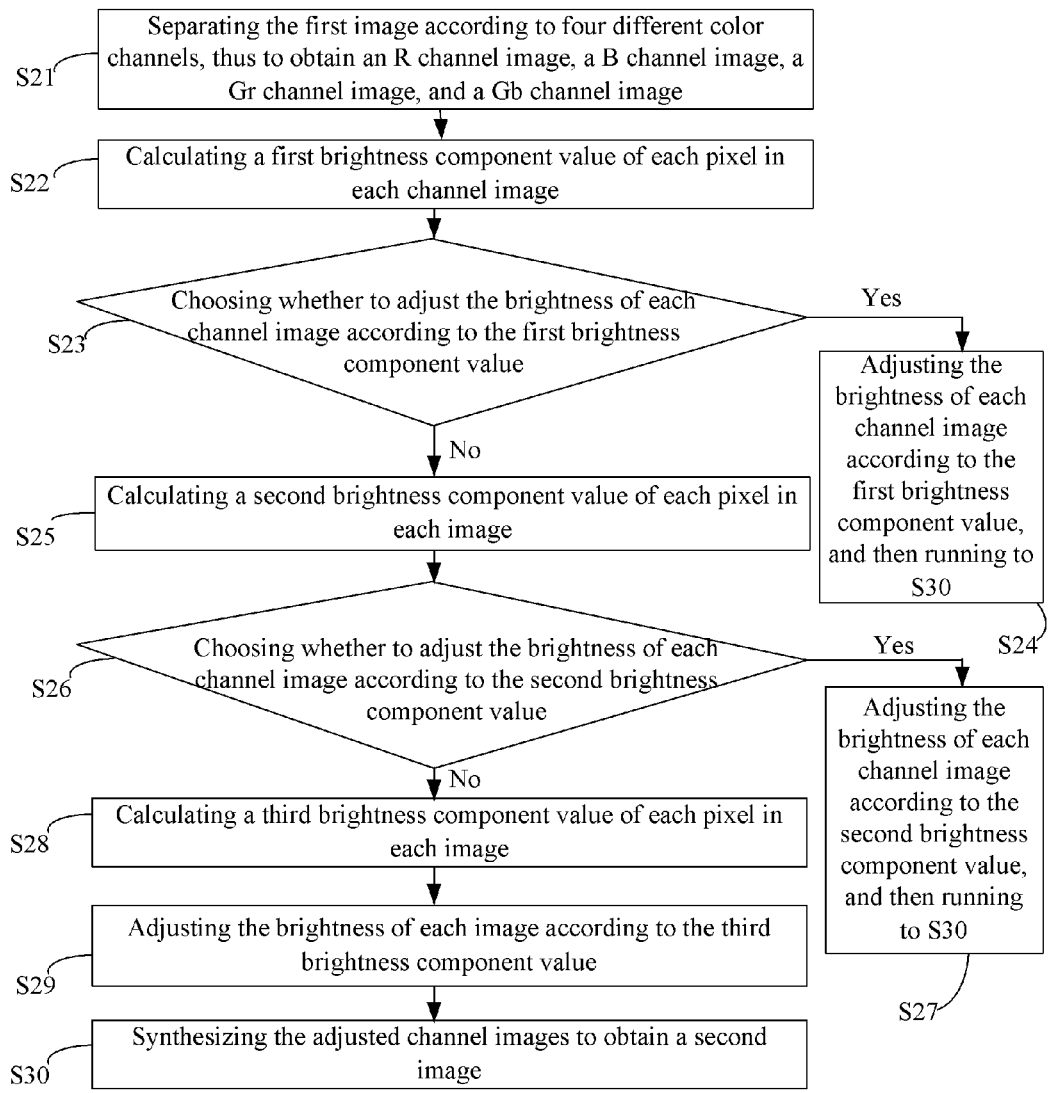
FIG. 5 is a sub-flow chart of the method of FIG. 4, according to one embodiment.

Referring to FIG. 5, in one embodiment, S2 will be described as follows.

In S21, the first image is separated according to four different color channels, thus to obtain an R channel image, a B channel image, a Gr channel image, and a Gb channel image.

In S22, a first brightness component value of each pixel in each channel image is calculated.

In S23, whether to adjust the brightness of each channel image according to the first brightness component value of each pixel in each channel image is chosen. If yes, running to S24; if not, running to S25.

In S24, the brightness of each channel image is adjusted according to the first brightness component value of each pixel in each channel image.

In S25, a second brightness component value of each pixel in each channel image is calculated, based on the first brightness component value.

In S26, whether to adjust the brightness of each channel image according to the second brightness component value of each pixel in each channel image is chosen. If yes, running to S27; if not, running to S28.

In S27, the brightness of each channel image is adjusted according to the second brightness component value of each pixel in each channel image.

In S28, a third brightness component value of each pixel in each channel image is calculated, based on the second brightness component value.

In S29, the brightness of each channel image is adjusted according to the third brightness component value of each pixel in each channel image.

In S30, the four adjusted channel images are synthesized to obtain a second image.

Figure 6:
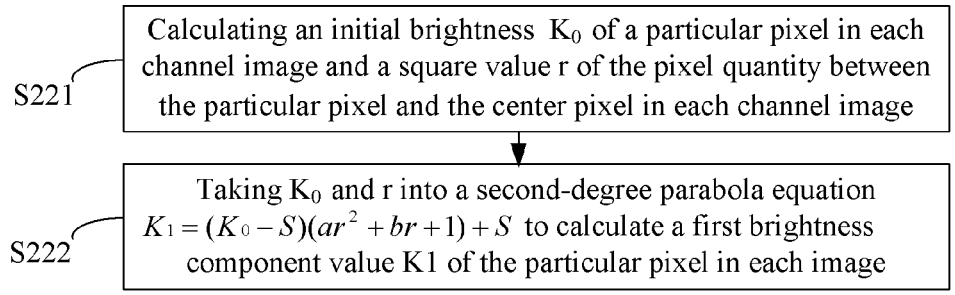
FIG. 6 is a first sub-flow chart of the method of FIG. 5.

Referring to FIG. 6, S22 will be described as follows.

In S221, an initial brightness component value $K_0$ of each pixel in each channel image and a square value r of the pixel quantity between each pixel and a center pixel in each channel image are calculated.

In S222, $K_0$ and r are taken into a second-degree parabola equation $K_1=(K_0-S)(ar^2+br+1)+S$ to calculate a first brightness component value $K_1$ of each pixel in each channel image. In the present embodiment, a is $5\times10^{-14}$, b is $7\times10^{-6}$, S is the optical black value (OB value) of the image sensor.

Figure 7:
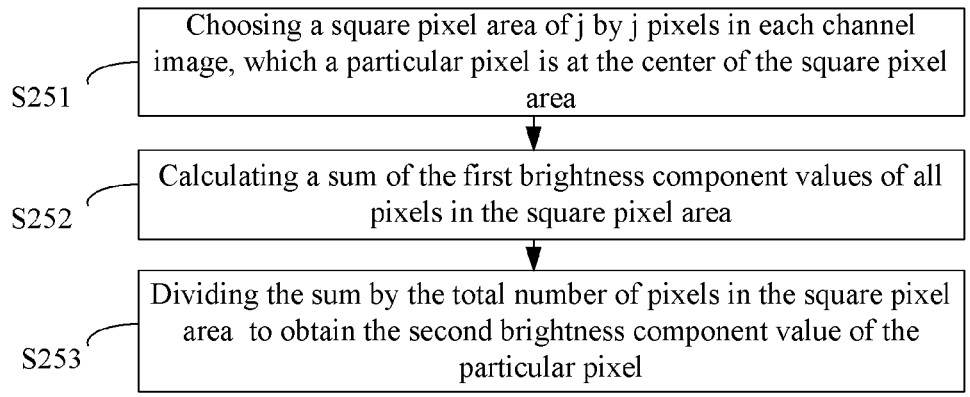
FIG. 7 is a second sub-flow chart of the method of FIG. 5.

Referring to FIG. 7, S25 will be described as follows.

In S251, a square pixel area of j by j (j×j) pixels in each channel image is chosen, wherein a particular pixel is at the center of the square pixel area.

In S252, a sum of the first brightness component values of all pixels in the square pixel area is calculated.

In S253, the sum is divided by the total number of pixels in the square pixel area to obtain the second brightness component value of the particular pixel. By this means, the second brightness component value of each pixel in each channel image is obtained. In this embodiment, j is 45.

Figure 8:
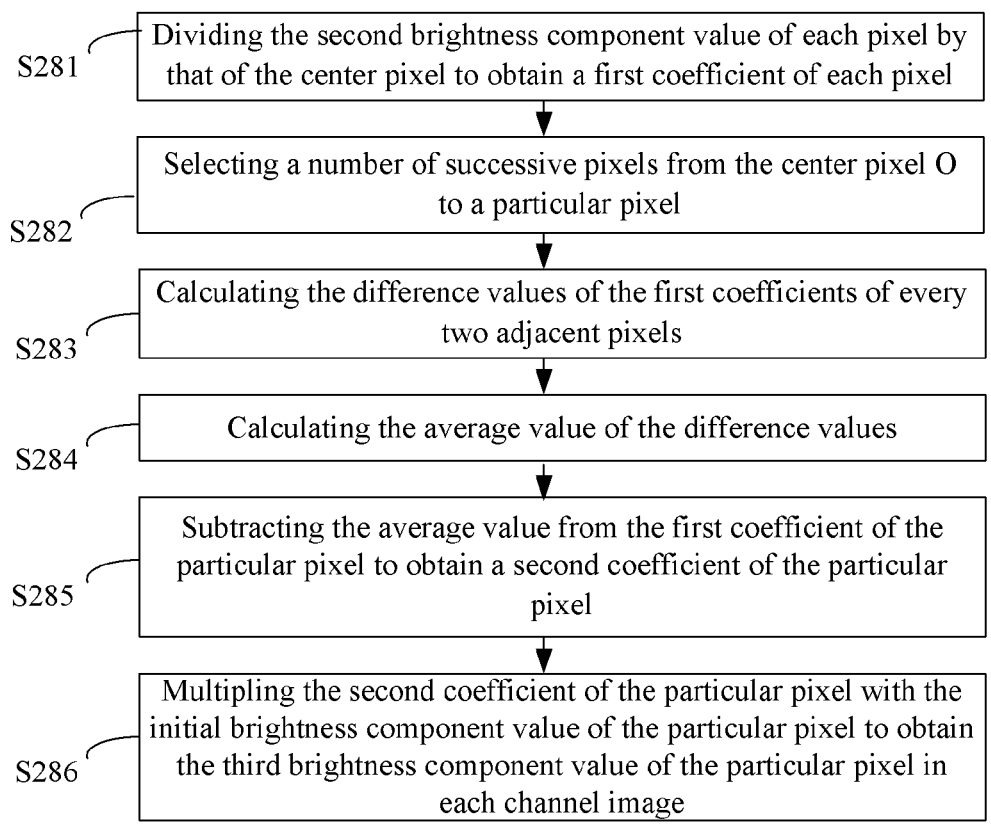
FIG. 8 is a third sub-flow chart of the method of FIG. 5.

Referring to FIG. 8, S28 will be described as follows.

In S281, the second brightness component value of each pixel is divided by that of the center pixel O to obtain a first coefficient of each pixel.

In S282, a number of successive pixels from the center pixel O to a particular pixel are selected. Referring to FIG. 2, successive pixels, B~H, arranged in a line along the direction from the center pixel O to the particular pixel A are selected. In this embodiment, the first coefficients of the eight pixels A~H are 0.99, 0.96, 0.88, 0.76, 0.64, 0.53, 0.48, 0.31, 0.29 respectively.

In S283, the difference values of the first coefficients of every two adjacent pixels are calculated. In this embodiment, the difference values of every two adjacent pixels are 0.03, 0.08, 0.12, 0.12, 0.11, 0.05, 0.15, 0.02 respectively.

In S284, the average value of the difference values is calculated. In this embodiment, the average value of the eight difference values is 0.085.

In S285, the average value is subtracted from the first coefficient of the particular pixel to obtain a second coefficient of the particular pixel. In the present embodiment, the second coefficient of the particular pixel A is 0.99−0.085=0.905.

In S286, the second coefficient of the particular pixel is multiplied with the initial brightness component value of the particular pixel to obtain the third brightness component value of the particular pixel in each channel image. By this means, the third brightness component value of each pixel in each channel image is obtained.

Figure 9:
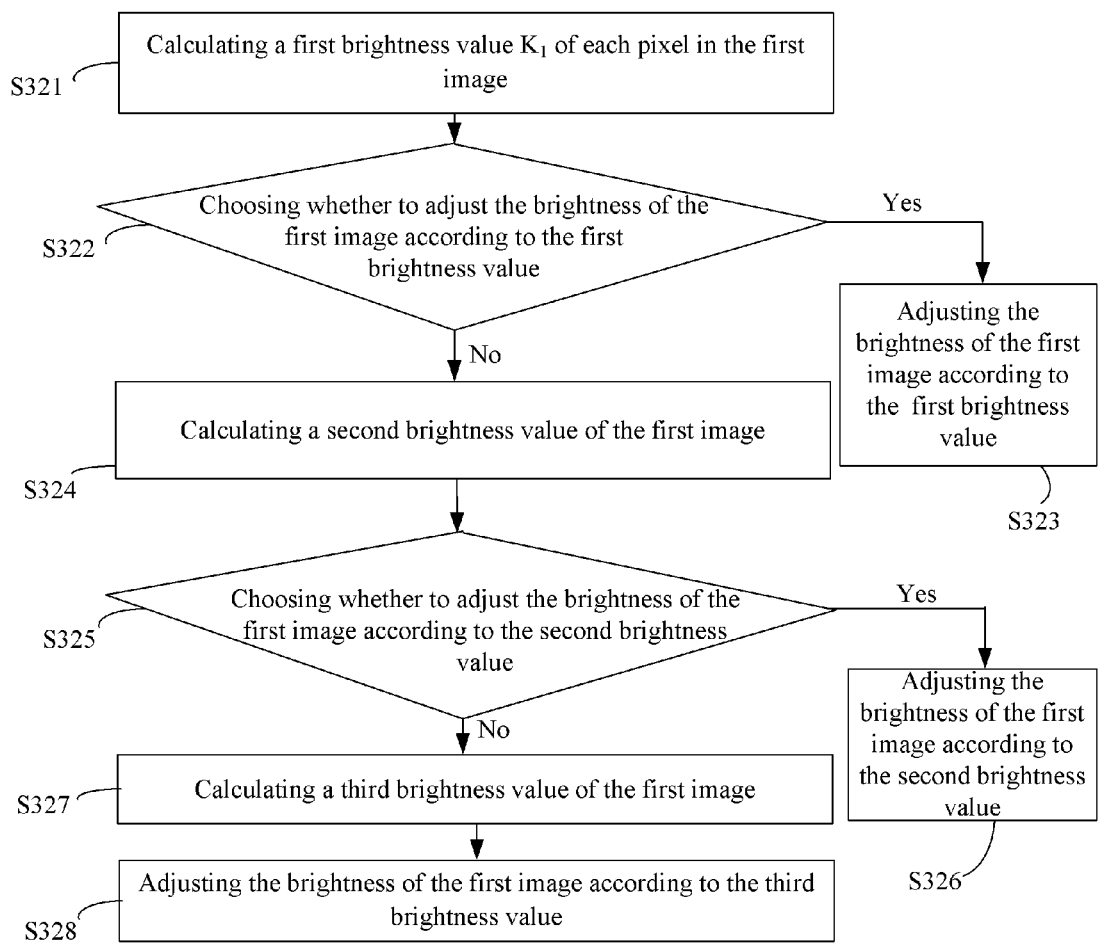
FIG. 9 is a sub-flow chart of the method of FIG. 4, according to another embodiment.

Referring to FIG. 9, in another embodiment, S2 will be described as follows.

In S321, a first brightness value of each pixel in the first image is calculated. The first brightness value of each pixel $K_1$ is calculated by a second degree parabola equation $K_1=(K_0-S)(ar^2+br+1)+S$, wherein $K_0$ represents an initial brightness value of each pixel in the first image, a is $5\times10^{-14}$, b is $7\times10^{-6}$, r represents the square value of the pixel quantity between each pixel and a center pixel in the first image, and S is the optical black value of the image sensor.

In S322: whether to adjust the brightness of the first image according to the first brightness value is chosen. If yes, running to S323; if not, running to S324.

In S323, the brightness of the first image is adjusted according to the first brightness value.

In S324: a second brightness value of each pixel in the first image is calculated. The second brightness value of one pixel is calculated by dividing a sum of the first brightness of all pixels in a square pixel area with the total number of pixels in the square pixel area, the square pixel area has j×j pixels, the pixel is located at the center of the square pixel area.

S325: whether to adjust the brightness of the first image according to the second brightness value is chosen. If yes, running to S326; if not, running to S327.

S326: the brightness of the first image is adjusted according to the second brightness value.

S327: a third brightness value of each pixel in the first image is calculated. The third brightness of one pixel in the first image is calculated by: dividing the second brightness of the pixel by that of the center pixel to obtain a first coefficient of the pixel; selecting a number of successive pixels arranged in a line along the direction from the center pixel to the pixel; calculating the difference values of the first coefficients of every two adjacent pixels; calculating an average value of the difference values; subtracting the average value from the first coefficient of the pixel to obtain a second coefficient of the pixel; multiplying the second coefficient by the initial brightness of the pixel to obtain the third brightness of the pixel in the first image.

S328: the brightness of the first image is adjusted according to the third brightness value to obtain the second image.

It will be understood that the above particular embodiments and methods are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A blemish detection system, comprising:
   an image capturing module comprising an image sensor configured for capturing a first image;
   a brightness adjusting module configured for adjusting the brightness of the first image to obtain a second image, the second image having substantially uniform brightness; and
   a blemish detecting module storing a predetermined reference value and a predetermined pixel quantity and configured for calculating a brightness ratio of each pixel in the second image and marking the pixels of which the brightness ratios are greater than or equal to the predetermined reference value as "1" and marking the pixels of which the brightness ratios are smaller than the predetermined reference value as "0", the blemish detecting module also configured for calculating the quantity of the pixels in a continuous area in which all pixels are marked as "1" and determining that the continuous area is a blemish if the quantity of the pixels in the continuous area is greater than or equal to the predetermined pixel quantity.

2. The blemish detection system of claim 1, wherein the brightness ratio of one pixel in the second image is calculated by dividing a first average brightness value of all pixels in a first square pixel area with a second average brightness value of all pixels in a second square pixel area, the first square pixel area has m×m pixels, the second square pixel area has n×n pixels, the first and second square pixel areas are concentric, the pixel is located at the centers of the first and second square pixel areas, m and n are integer, m is smaller than n.

3. The blemish detection system of claim 1, wherein the brightness adjusting module comprises:
an image separating unit configured for separating the first image into a plurality of different channel images;
a first computing unit configured for calculating a first brightness component value K1 of each pixel in each channel image based on a second degree parabola equation $K_1=(K_0-S)(ar^2+br+1)+S$, wherein K0 represents an initial brightness component value of each pixel in each channel image, a is $5\times10^{-14}$, b is $7\times10^{-6}$ r represents the square value of the pixel quantity between each pixel and a center pixel in each channel image, and S is the optical black value of the image sensor;
a brightness adjusting unit configured for adjusting the brightness of each channel image according to the first brightness component value of each channel image; and
an image synthesizing unit configured for synthesizing the adjusted channel images to obtain the second image.

4. The blemish detection system of claim 1, wherein the brightness adjusting module comprises:
an image separating unit configured for separating the first image into a plurality of different channel images;
a first computing unit configured for calculating a first brightness component value K1 of each pixel in each channel image based on a second degree parabola equation $K_1=(K_0-S)(ar^2+br+1)+S$, wherein K0 represents an initial brightness component value of each pixel in each channel image, a is $5\times10^{-14}$, b is $7\times10^{-6}$, r represents the square value of the pixel quantity between each pixel and a center pixel in each channel image, and S is the optical black value of the image sensor;
a second computing unit configured for calculating a second brightness component value of each pixel, wherein the second brightness component value of one pixel is calculated by dividing a sum of the first brightness component values of all pixels in a square pixel area with the total number of pixels in the square pixel area, the square pixel area has j×j pixels, the pixel is located at the center of the square pixel area;
a choosing unit configured for choosing whether to adjust the brightness of each channel image according to the first brightness component value of each channel image;
a brightness adjusting unit configured for adjusting the brightness of each channel image according to the choosing result from the choosing unit; and
an image synthesizing unit configured for synthesizing the adjusted channel images to obtain the second image.

5. The blemish detection system of claim 1, wherein the brightness adjusting module comprises:
an image separating unit configured for separating the first image into a plurality of different channel images;
a first computing unit configured for calculating a first brightness component value K1 of each pixel in each channel image based on a second degree parabola equation $K_1=(K_0-S)(ar^2br+1)+S$, wherein K0 represents an initial brightness component value of each pixel in each channel image, a is $5\times10^{-14}$, b is $7\times10^{-6}$, r represents the square value of the pixel quantity between each pixel and a center pixel in each channel image, and S is the optical black value of the image sensor;
a second computing unit configured for calculating a second brightness component value of each pixel in each channel image, wherein the second brightness component value of one pixel is calculated by dividing a sum of the first brightness component values of all pixels in a square pixel area with the total number of pixels in the square pixel area, the square pixel area has j×j pixels, the pixel is located at the center of the square pixel area;
a third computing unit configured for calculating a third brightness component value of each pixel in each channel image, wherein the third brightness component value of one pixel is calculated by: dividing the second brightness component value of the pixel by that of the center pixel to obtain a first coefficient of the pixel; selecting a number of successive pixels arranged in a line along the direction from the center pixel to the pixel; calculating the difference values of the first coefficients of every two adjacent pixels; calculating an average value of the difference values; subtracting the average value from the first coefficient of the pixel to obtain a second coefficient of the pixel; multiplying the second coefficient by the initial brightness component value of the pixel to obtain the third brightness component value of the pixel;
a choosing unit configured for choosing whether to adjust the brightness of each channel according to the first brightness component value or the second brightness component value;
a brightness adjusting unit configured for adjusting the brightness of each channel image according to the choosing result from the choosing unit; and
an image synthesizing unit configured for synthesizing the adjusted channel images to obtain the second image.

6. The blemish detection system of claim 1, wherein the brightness adjusting module comprises:
a first computing unit configured for calculating a first brightness value K1 of each pixel in the first image based on a second degree parabola equation $K_1=(K_0-S)(ar^2br+1)+S$, wherein K0 represents an initial brightness value of each pixel in the first image, a is $5\times10^{-14}$, b is $7\times10^{-6}$, r represents the square value of the pixel quantity between each pixel and a center pixel in the first image, and S is the optical black value of the image sensor; and
a brightness adjusting unit configured for adjusting the brightness of the first image according to the first brightness value.

7. The blemish detection system of claim 1, wherein the brightness adjusting module comprises:
a first computing unit configured for calculating a first brightness value K1 of each pixel in the first image based on a second degree parabola equation $K_1=(K_0-S)(ar^2br+1)+S$, wherein K0 represents an initial brightness value of each pixel in the first image, a is $5\times10^{-14}$, b is $7\times10^{-6}$, r represents the square value of the pixel quantity between each pixel and a center pixel in the first image, and S is the optical black value of the image sensor;

a second computing unit configured for calculating a second brightness value of each pixel in the first image, wherein the second brightness of one pixel is calculated by dividing a sum of the first brightness of all pixels in a square pixel area with the total number of pixels in the square pixel area, the square pixel area has j×j pixels, the pixel is located at the center of the square pixel area;

a choosing unit configured for choosing whether to adjust the brightness of the first image according to the first brightness value;

a brightness adjusting unit configured for adjusting the first image according to the choosing result from the choosing unit.

8. The blemish detection system of claim 1, wherein the brightness adjusting module comprises:

a first computing unit configured for calculating a first brightness value K1 of each pixel in the first image based on a second degree parabola equation $K_1=(K_0-S)(ar^2br+1)+S$, wherein K0 represents an initial brightness of each pixel in the first image, a is $5\times10^{-14}$, b is $7\times10^{-6}$, r represents the square value of the pixel quantity between each pixel and a center pixel in the first image, and S is the optical black value of the image sensor;

a second computing unit configured for calculating a second brightness of each pixel in the first image, wherein the second brightness value of one pixel is calculated by dividing a sum of the first brightness of all pixels in a square pixel area with the total number of pixels in the square pixel area, the square pixel area has j×j pixels, the pixel is located at the center of the square pixel area;

a third computing unit configured for calculating a third brightness value of each pixel in the first image, wherein the third brightness of one pixel is calculated by: dividing the second brightness of the pixel by that of the center pixel to obtain a first coefficient of the pixel; selecting a number of successive pixels arranged in a line along the direction from the center pixel to the pixel; calculating the difference values of the first coefficients of every two adjacent pixels; calculating an average value of the difference values; subtracting the average value from the first coefficient of the pixel to obtain a second coefficient of the pixel; multiplying the second coefficient by the initial brightness of the pixel to obtain the third brightness of the pixel;

a choosing unit configured for choosing whether to adjust the brightness of the first image according to the first brightness value or the second brightness value; and a brightness adjusting unit configured for adjusting the brightness of the first image according to the choosing result from the choosing unit.

9. The blemish detection system of claim 8, wherein the brightness adjusting module comprises a first storing unit storing the second-degree parabola equation.

10. The blemish detection system of claim 1, wherein the blemish detecting module comprises:

a second storing unit storing the predetermined reference value and the predetermined pixel quantity;

a second computing unit configured for calculating the brightness ratio of each pixel and the quantity of the pixels in the continuous area;

a comparison unit configured for comparing the brightness ratio of each pixel with the predetermined reference value and comparing the quantity of the pixels in the continuous area with the predetermined pixel quantity;

a marking unit configured for marking the pixel as "0" or "1", and marking the location of the determined blemish; and a searching unit configured for searching the continuous area in which all pixels are marked as "1".

11. The blemish detection system of claim 1, wherein the predetermined reference value is 0.1, the predetermined pixel quantity is 82.

12. A blemish detection method, comprising the following steps:

capturing a first image using an image sensor;

adjusting the brightness of the first image to obtain a second image;

calculating a brightness ratio of each pixel in the second image;

marking the pixels of which the brightness ratios are greater than or equal to a predetermined reference value as "1", and marking the other pixels as "0";

calculating the quantity of pixels in a continuous area in which all pixels are marked as "1"; and determining that the continuous area is a blemish if the quantity of pixels in the continuous area is greater than or equal to a predetermined pixel quantity.

13. The blemish detection method of claim 12, wherein the predetermined reference value is 0.1, the predetermined pixel quantity is 82.

14. The blemish detection method of claim 12, wherein calculating the brightness ratio of one pixel in the second image comprises:

choosing a first square pixel area of m by m pixels and a second square pixel area of n by n pixels, both of which are centered at the pixel, wherein m and n are integer, m<n;

averaging the brightness of all pixels in the first square pixel area to obtain a first average brightness value of the pixel;

averaging the brightness value of all pixels in the second square pixel area to obtain a second average brightness value of the pixel;

dividing the first average brightness value by the second average brightness value of the pixel to obtain the brightness ratio of the pixel.

15. The blemish detection method of claim 12, wherein the step of adjusting the brightness of the first image to obtain a second image comprises:

separating the first image into a plurality of different channel images;

calculating a first brightness component value K1 of each pixel in each channel image based on a second degree parabola equation $K_1=(K_0-S)(ar^2+br+1)+S$, wherein K0 represents an initial brightness component value of each pixel in each channel image, a is $5\times10^{-14}$, b is $7\times10^{-6}$, r represents the square value of the pixel quantity between each pixel and a center pixel in each channel image, and S is the optical black value of the image sensor;

adjusting the brightness of each channel image according to the first brightness component value of each channel image; and synthesizing the adjusted channel images to obtain the second image.

16. The blemish detection method of claim 12, wherein the step of adjusting the brightness of the first image to obtain a second image comprises:

separating the first image into a plurality of different channel images;

calculating a first brightness component value K1 of each pixel in each channel image based on a second degree parabola equation $K_1=(K_0-S)(ar^2+br+1)+S$, wherein K0 represents an initial brightness component value of each pixel in each channel image, a is $5\times10^{-14}$, b is $7\times10^{-6}$, r represents the square value of the pixel quantity between each pixel and a center pixel in each channel image, and S is the optical black value of the image sensor;

choosing whether to adjust the brightness of each channel image according to the first brightness component value of each channel image;

calculating a second brightness component value of each pixel if choosing not to adjust the brightness of each channel image according to the first brightness component value, wherein the second brightness component value of one pixel is calculated by dividing a sum of the first brightness component values of all pixels in a square pixel area with the total number of pixels in the square pixel area, the square pixel area has j×j pixels, the pixel is located at the center of the square pixel area;

adjusting the brightness of each channel image according to the second brightness component value; and synthesizing the adjusted channel images to obtain the second image.

17. The blemish detection method of claim 12, wherein the step of adjusting the brightness of the first image to obtain a second image comprises:

separating the first image into a plurality of different channel images;

calculating a first brightness component value K1 of each pixel in each channel image based on a second degree parabola equation $K_1=(K_0-S)(ar^2+br+1)+S$, wherein K0 represents an initial brightness component value of each pixel in each channel image, a is $5\times10^{-14}$, b is $7\times10^{-6}$, r represents the square value of the pixel quantity between each pixel and a center pixel in each channel image, and S is the optical black value of the image sensor;

choosing whether to adjust the brightness of each channel image according to the first brightness component value of each channel image;

calculating a second brightness component value of each pixel if choosing not to adjust the brightness of each channel image according to the first brightness component value, wherein the second brightness component value of one pixel is calculated by dividing a sum of the first brightness component values of all pixels in a square pixel area with the total number of pixels in the square pixel area, the square pixel area has j×j pixels, the pixel is located at the center of the square pixel area;

choosing whether to adjust the brightness of each channel image according to the second brightness component value;

calculating a third brightness component value of each pixel if choosing not to adjust the brightness of each channel image according to the second brightness component value, wherein the third brightness component value of one pixel is calculated by: dividing the second brightness component value of the pixel by that of the center pixel to obtain a first coefficient of the pixel; selecting a number of successive pixels arranged in a line along the direction from the center pixel to the pixel; calculating the difference values of the first coefficients of every two adjacent pixels; calculating an average value of the difference values; subtracting the average value from the first coefficient of the pixel to obtain a second coefficient of the pixel; multiplying the second coefficient by the initial brightness component value of the pixel to obtain the third brightness component value of the pixel;

adjusting the brightness of each channel image according to the third brightness component values; and synthesizing the adjusted channel images to obtain the second image.

18. The blemish detection method of claim 12, wherein the step of adjusting the brightness of the first image to obtain a second image comprises:

calculating a first brightness K1 of each pixel in the first image based on a second degree parabola equation $K_1=(K_0-S)(ar^2+br+1)+S$, wherein K0 represents an initial brightness of each pixel in the first image, a is $5\times10^{-14}$, b is $7\times10^{-6}$, r represents the square value of the pixel quantity between each pixel and a center pixel in the first image, and S is the optical black value of the image sensor; and adjusting the brightness of the first image according to the first brightness value to obtain the second image.

19. The blemish detection method of claim 12, wherein the step of adjusting the brightness of the first image to obtain a second image comprises:

calculating a first brightness value K1 of each pixel in the first image based on a second degree parabola equation $K_1=(K_0-S)(ar^2+br+1)+S$, wherein K0 represents an initial brightness of each pixel in the first image, a is $5\times10^{-14}$, b is $7\times10^{-6}$, r represents the square value of the pixel quantity between each pixel and a center pixel in the first image, and S is the optical black value of the image sensor;

choosing whether to adjust the brightness of the first image according to the first brightness value;

calculating a second brightness of each pixel if choosing not to adjust the brightness of the first image according to the first brightness value, wherein the second brightness of one pixel is calculated by dividing a sum of the first brightness of all pixels in a square pixel area with the total number of pixels in the square pixel area, the square pixel area has j×j pixels, the pixel is located at the center of the square pixel area; and adjusting the brightness of the first image according to the second brightness value to obtain the second image.

20. The blemish detection method of claim 12, wherein the step of adjusting the brightness of the first image to obtain a second image comprises:

calculating a first brightness value K1 of each pixel in the first image based on a second degree parabola equation $K_1=(K_0-S)(ar^2+br+1)+S$, wherein K0 represents an initial brightness value of each pixel in the first image, a is $5\times10^{-14}$, b is $7\times10^{-6}$, r represents the square value of the pixel quantity between each pixel and a center pixel in the first image, and S is the optical black value of the image sensor;

choosing whether to adjust the brightness of the first image according to the first brightness value;

calculating a second brightness of each pixel if choosing not to adjust the brightness of the first image according to the first brightness value, wherein the second brightness of one pixel is calculated by dividing a sum of the first brightness of all pixels in a square pixel area with the total number of pixels in the square pixel area, the square pixel area has j×j pixels, the pixel is located at the center of the square pixel area;

choosing whether to adjust the brightness of the first image according to the second brightness;

calculating a third brightness value of each pixel in the first image if choosing not to adjust the brightness of the first image according to the second brightness value, wherein the third brightness of one pixel is calculated by: dividing the second brightness of the pixel by that of the center pixel to obtain a first coefficient of the pixel; selecting a number of successive pixels arranged in a line along the direction from the center pixel to the pixel; calculating the difference values of the first coefficients of every two adjacent pixels; calculating an average value of the difference values; subtracting the average value from the first coefficient of the pixel to obtain a second coefficient of the pixel; multiplying the second coefficient by the initial brightness of the pixel to obtain the third brightness of the pixel; and adjusting the brightness of the first image according to the third brightness value to obtain the second image.

* * * * *